May 6, 1924.
E. LA ROCHE
POISON DISTRIBUTOR
Filed June 19, 1923
1,493,349
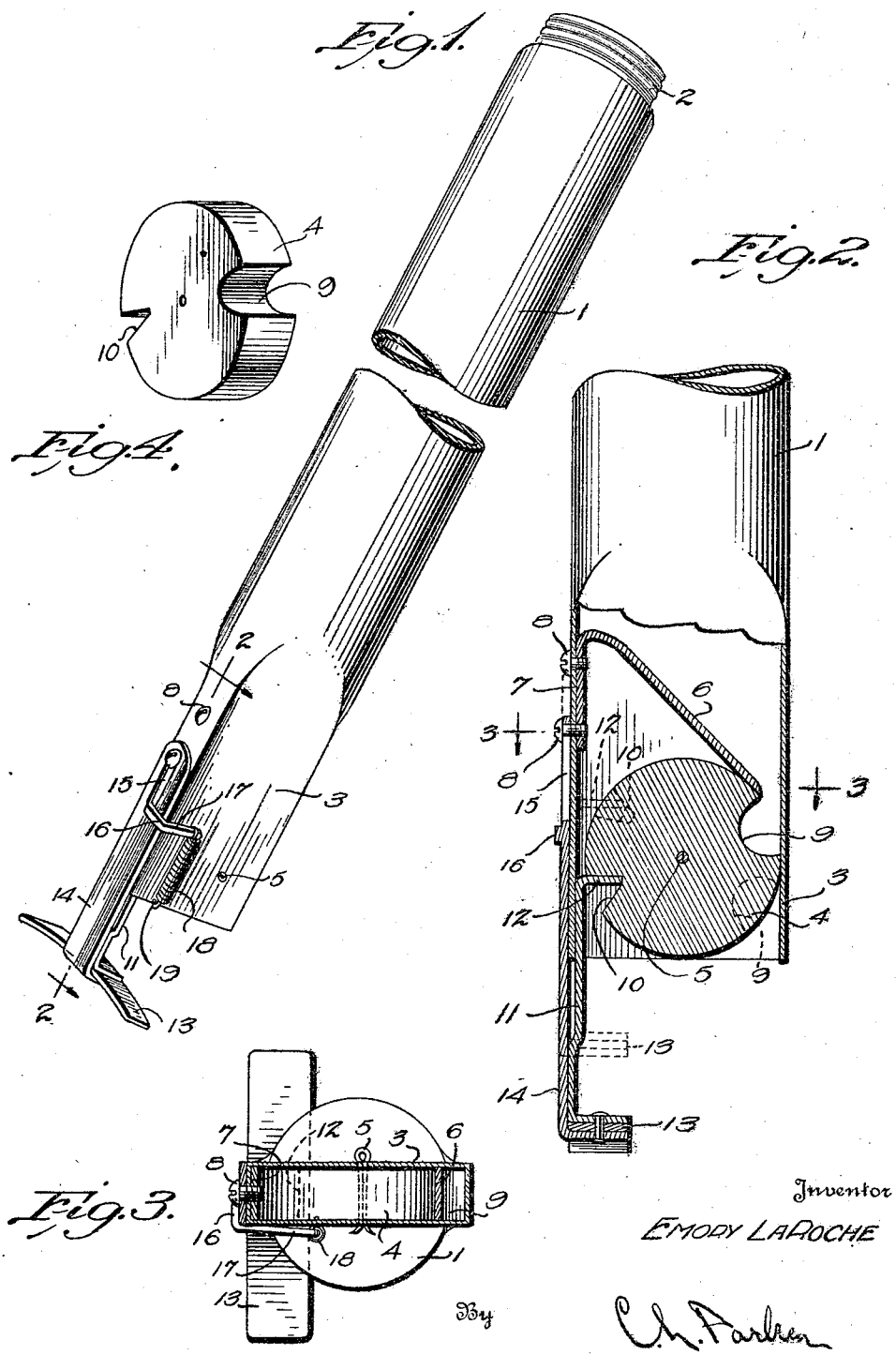
Inventor
EMORY LAROCHE
By
C. N. Parker
Attorney Patented May 6, 1924.

1,493,349

UNITED STATES PATENT OFFICE.

EMORY LA ROCHE, OF MADOC, MONTANA.

POISON DISTRIBUTOR.

Application filed June 19, 1923. Serial No. 646,442.

*To all whom it may concern:*

Be it known that I, EMORY LA ROCHE, a citizen of the United States, residing at Madoc, in the county of Daniels and State of Montana, have invented certain new and useful Improvements in Poison Distributors, of which the following is a specification.

This invention relates to poison distributors, and more particularly to an apparatus for distributing the poisoned grain or the like at desired points for killing undesirable animals, such as gophers.

An object of the invention is to provide a poison distributor having ground engaging operating means adapted to be operated by pressure.

A further object is the provision of spring actuated means for returning the apparatus to normal position.

In the form of the invention illustrated, I provide a cylindrical container having a valve in its lower end, means for rotating the valve, and spring actuated means for returning the valve to normal position.

In the accompanying drawings, I have shown one embodiment of the invention. In this showing:

Figure 1 is a perspective view,

Figure 2 is a side elevation of the lower end of the device, parts being shown in section, Figure 3 is a horizontal sectional view on line 3—3 of Figure 2, and Figure 4 is a detail view of the valve.

Referring to the drawings, the reference numeral 1 designates a container which may be made of any desired size and shape, and which as shown, is preferably formed cylindrical and of sufficient length to reach from the operator's hand to the ground. The upper end is threaded, as at 2, for the reception of a cap. As shown, the lower end of the container is flattened, as at 3, and is adapted to receive a rotating valve 4. This valve is mounted on a suitable pin 5, forming a support and extending through the opposite walls of the container. Immediately above the valve, there is provided a guide 6 extending from one wall to a point near the opposite wall, providing a hopper for delivery of the grain or other material to the valve. As shown, the plate is provided with an extended portion 7 secured to the wall by means of suitable fastening elements 8. The valve is provided with a cut-out portion 9 which is normally arranged beneath the hopper outlet and is adapted to receive a charge of the poisoned grain. Immediately opposite the cut-out portion, the valve is provided with a recess 10. The slidably mounted arm 11 extends within the lower end of the device and is provided with an offset portion 12 arranged in the cut-out portion 10 of the valve member. The lower end of this arm is connected to a foot 13. An arm 14 is also connected to this foot and extends upwardly on the outside of the casing. As shown, the arm is provided with a slot 15 adapted to receive one of the fastening elements 8 to limit its movement. This arm is further provided with a projecting member 16, the end of which is extended along the side of the casing, as indicated at 17. A coil spring 18 is secured to the end of this projecting member, and the other end of the coil spring is secured to the casing, as indicated at 19.

The operation of the device will be apparent from the foregoing description. Upon each rotation of the valve 4, a charge of poisoned grain arranged in the recess 9 is delivered from the bottom of the casing. The valve is rotated by placing the foot 13 on the ground and pressing downwardly with sufficient pressure to overcome the tension of the spring 18. The foot then moves upwardly and the inner slidable arm 11 assumes the dotted line position shown, rotating the valve and discharging the contents of the recess 9. The upward movement of the foot and arm 11 is limited by the slotted portion 15 of the arm 14. When the lower end of the slot engages the pin 8, the upward movement of the arm is arrested, thus preventing the offset portion 12 of the arm 11 from becoming disconnected from the valve. As soon as the pressure is released, the parts are returned to the normal position by means of the spring 18.

It is to be understood that the form of the invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

In a device of the character described, a casing having an open end, a rotating valve arranged in the open end of said casing, said valve being provided with a cut-out portion, an arm arranged in the end of said casing and provided with an offset end disposed in the cut-out portion of said valve, the other end of said arm projecting beyond said casing, a foot connected to the end of said arm, a second arm connected to said foot and extending over the exterior of said casing, said arm being provided with a slot, and a pin carried by said casing and mounted in said slot to limit the movement of said arms and said valve.

In testimony whereof, I affix my signature in presence of two witnesses.

EMORY LA ROCHE.

Witnesses:
B. D. TEMPLEMAN,
G. D. BRADLEY.